US011425794B2

(12) United States Patent
Qiu

(10) Patent No.: US 11,425,794 B2
(45) Date of Patent: Aug. 23, 2022

(54) ELECTRONIC CIGARETTE AND METHOD FOR CONTROLLING THE SAME

(71) Applicant: CHANGZHOU JWEI INTELLIGENT TECHNOLOGY CO., LTD., Changzhou (CN)

(72) Inventor: Wei-Hua Qiu, ChangZhou (CN)

(73) Assignee: CHANGZHOU JWEI INTELLIGENT TECHNOLOGY CO., LTD., Changzhou (CN)

( * ) Notice: Subject to any disclaimer, the term of this patent is extended or adjusted under 35 U.S.C. 154(b) by 355 days.

(21) Appl. No.: 16/209,204

(22) Filed: Dec. 4, 2018

(65) Prior Publication Data

US 2019/0124989 A1 May 2, 2019

Related U.S. Application Data

(63) Continuation-in-part of application No. PCT/CN2017/094686, filed on Jul. 27, 2017.

(30) Foreign Application Priority Data

Aug. 17, 2016 (CN) ......................... 201610681642.1

(51) Int. Cl.

| | |
|---|---|
| ***A01G 13/06*** | (2006.01) |
| ***H05B 1/02*** | (2006.01) |
| ***A24F 40/50*** | (2020.01) |
| ***G05B 15/02*** | (2006.01) |

(52) U.S. Cl.

CPC ........... *H05B 1/0244* (2013.01); *A24F 40/50* (2020.01); *G05B 15/02* (2013.01); *H05B 1/0297* (2013.01); *H05B 2203/021* (2013.01)

(58) Field of Classification Search

CPC .......... A24F 40/00; A24F 40/10; A24F 40/20; A24F 40/30; A24F 40/40–46; A24F 40/50–57; A24F 40/60; A24F 40/80; A24F 47/008; G05B 15/02; H05B 1/0244; H05B 1/0297; H05B 2203/021

USPC .................................................. 392/386–387

See application file for complete search history.

(56) References Cited

U.S. PATENT DOCUMENTS

2011/0036346 A1* 2/2011 Cohen ..................... A24F 40/60 128/200.14
2014/0251356 A1 9/2014 Xiang
2016/0157524 A1* 6/2016 Bowen ................. H05B 1/0244 128/200.14
2016/0242466 A1* 8/2016 Lord ....................... A24F 40/50

FOREIGN PATENT DOCUMENTS

CN 104026743 A 9/2014
CN 104095299 A 10/2014

* cited by examiner

*Primary Examiner* — Sang Y Paik

(74) *Attorney, Agent, or Firm* — ScienBiziP, P.C.

(57) ABSTRACT

A method for controlling an electronic cigarette to take account of a malfunctioning or non-functioning airflow sensor includes sensing airflow through the electronic cigarette and generating a signal according to each airflow or inhalation. The signal causes a first time counter (first stopwatch) to begin counting and the atomizer is operable, until a preset time period has been counted. Other preset time periods can be set to begin and be counted after combinations of signals and periods have occurred, to allow user to continue using electronic cigarette in a normal manner.

9 Claims, 4 Drawing Sheets

Start
21 Sense each airflow around electronic cigarette and generate a signal
22 Is the signal a first level signal?
no
yes
23 Control first stopwatch and atomizer to operate, thus the first stopwatch begins to count a duration of the first level signal
24 Control an operation state of the atomizer according to the counted duration of the first level signal
End

ELECTRONIC CIGARETTE AND METHOD FOR CONTROLLING THE SAME

CROSS-REFERENCE TO RELATED APPLICATIONS

This application claims all benefits accruing under 35 U.S.C. § 119 from China Patent Application No. 201610681642.1, filed on Aug. 17, 2016 in the China National Intellectual Property Administration, the content of which is hereby incorporated by reference. This application is a continuation-in-part under 35 U.S.C. § 120 of international patent application PCT/CN2017/094686 filed Jul. 27, 2017.

FIELD

The present disclosure relates to electronic cigarettes.

BACKGROUND

Electronic cigarettes can simulate the feeling of tobacco smoking, and thus can be substituted for combustible cigarettes and other smoked tobacco products. The electronic cigarette usually includes an atomizer, an airflow sensor, a controller, and a battery configured to supply electric power to the atomizer and the controller. The atomizer can heat liquid nicotine or other nicotine substitutes to generate smoke that the use can inhale. Usually, the airflow sensor senses an airflow around the electronic cigarette to determine whether a user inhales to simulate movements of smoking. The controller controls the atomizer to operate when the airflow sensor senses that the user inhales.

However, the airflow sensor may be faulty through manufacture or in daily use. Furthermore, the sensitivity of the airflow sensor may be affected by various factors. Thus, the atomizer may not function correctly to generate smoke. Therefore, there is room for improvement in the art.

BRIEF DESCRIPTION OF THE DRAWINGS

Implementations of the present disclosure will now be described, by way of example only, with reference to the attached figures.

DETAILED DESCRIPTION

Figure 1:
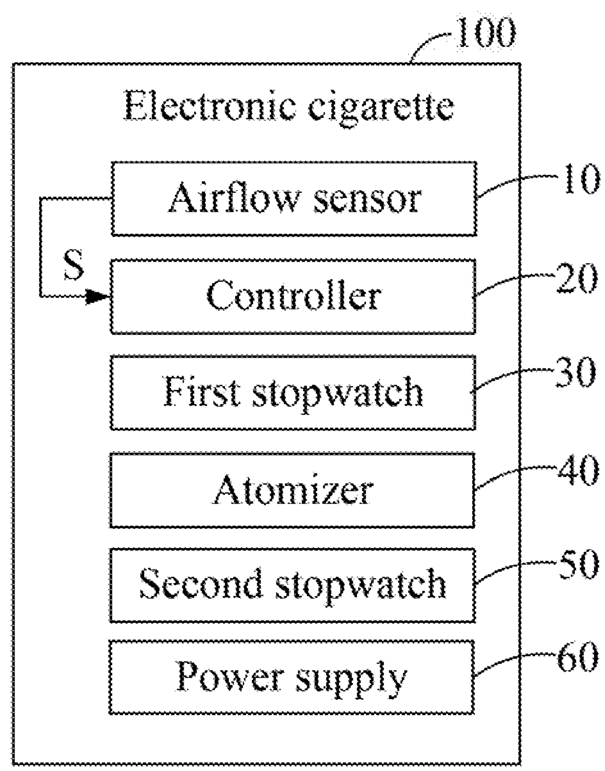
FIG. 1 is a block diagram of an embodiment of an electronic cigarette according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Furthermore, the word "controller," as used hereinafter, refers to logic embodied in hardware or firmware, or to a collection of software instructions, written in a programming language, such as, for example, Java, C, or assembly. One or more software instructions in the controllers may be embedded in firmware. It will be appreciated that controllers may comprise connected logic units, such as gates and flip-flops, and may comprise programmable units, such as programmable gate arrays or processors. The controllers described herein may be implemented as either software and/or hardware controllers and may be stored in any type of non-transitory computer-readable storage medium or other computer storage device.

FIG. 1 shows an embodiment of an electronic cigarette 100. The electronic cigarette 100 includes an airflow sensor 10, a controller 20, a first stopwatch 30, an atomizer 40, and a second stopwatch 50.

The airflow sensor 10 senses each airflow around the electronic cigarette 100 and generates a signal S according to each sensed airflow.

Figure 4:
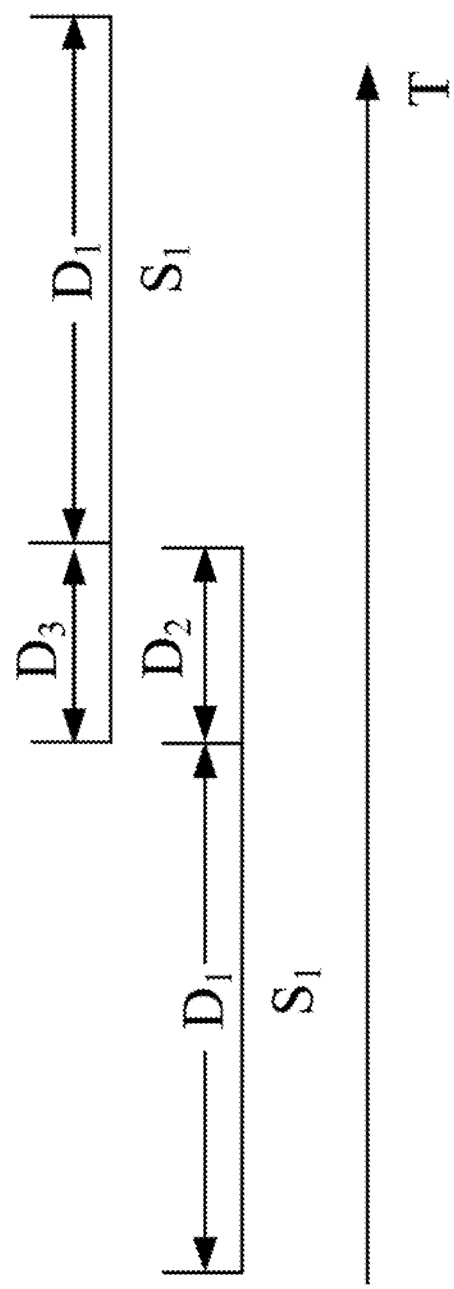
FIG. 4 is a diagram showing different durations of the present disclosure.

The controller 20 obtains each signal S from the airflow sensor 10, and determines whether the signal S is a first level signal $S_1$. Referring to FIG. 4, when the signal S is the first level signal $S_1$, the controller 20 controls the first stopwatch 30 and the atomizer 40 to operate, thus the first stopwatch 30 begins to count a duration $D_1$ of the first level signal $S_1$. In other embodiments, the electronic cigarette 100 does not respond to the signal S when the signal S is not the first level signal $S_1$.

In an embodiment, when the sensed airflow around the electronic cigarette 100 satisfies a smoking condition, the airflow sensor 10 generates the first level signal $S_1$. The sensed airflow satisfying the smoking condition includes a rate of the sensed airflow being greater than a rate threshold. The rate threshold is set to be greater than a rate of airflow in an ambient environment of the electronic cigarette 100 where the electronic cigarette is static and unused. The first level signal $S_1$ can be a high level signal or a low level signal.

In an embodiment, when the controller 20 controls the first stopwatch 30 and the atomizer 40 to operate, the controller 20 executes an interrupt service routine.

The controller 20 further controls an operation state of the atomizer 40 according to the counted duration $D_1$ of the first level signal $S_1$, through the following three ways.

The first way is when the counted duration $D_1$ of the first level signal $S_1$ reaches a first preset duration $D_{p1}$, a long inhalation time or a probable damage of the airflow sensor 10 is indicated. Then, the controller 20 controls the atomizer 40 to stop operating to avoid erroneous operation. Only when the next signal obtained by controller 20 is a second level signal $S_2$ which is different from the first level signal $S_1$ can the controller 20 control the atomizer 40 to operate again. The first preset duration $D_{p1}$ can be equal to a default inhalation duration or an inhalation duration set by the user. The first preset duration $D_{p1}$ can be for example 8 seconds to 12 seconds. The first preset duration $D_{p1}$ herein can be 10 seconds.

A high level signal is taken as the first level signal $S_1$ for example. Only the high level signal is arranged to be output when the airflow sensor 10 is damaged. When the controller 20 obtains the high level signal from the airflow sensor 10, the first stopwatch 30 and the atomizer 40 begin to operate.

When the duration $D_1$ of the high level signal reaches 10 seconds (the first preset duration $D_{p1}$), the controller 10 controls the atomizer 40 to stop operating. Afterwards, the atomizer 40 is turned off because the airflow sensor 10 continues to output one or more high level signals. Only when the next signal obtained by controller 20 is the low level signal can the controller 20 control the atomizer 40 to operate again. In another embodiment, only a low level signal is arranged to be output when the airflow sensor 10 is damaged. Once again, the atomizer 40 is turned off when the duration $D_1$ of the low level signal reaches 10 seconds. Only when the next signal obtained by controller 20 is the high level signal can the controller 20 control the atomizer 40 to operate again.

The second way is when the counted duration $D_1$ of the first level signal $S_1$ is less than the first preset duration $D_{p1}$, the inhalation may be taken as completed by the user. Then, the controller 20 can control the atomizer 40 to stop operating after such a shorter counted duration $D_1$.

Referring to FIG. 4, in an embodiment, the controller 20 controls the second stopwatch 50 to begin to operate after the counted duration $D_1$, thus the second stopwatch 50 begins to count time elapsing (duration $D_2$) after the end of the counted duration $D_1$. When the elapsing duration $D_2$ reaches a second preset duration $D_{p2}$, the controller 20 controls the atomizer 0 to stop operating. The second preset duration $D_{p2}$ can be a default inhalation duration or an inhalation duration set by the user. The second preset duration $D_{p2}$ can be for example 1 second to 3 seconds. The second preset duration $D_{p2}$ can be 1 second herein.

The third way is when the counted duration $D_1$ of the first level signal $S_1$ is less than the first preset duration $D_{p1}$, the controller 20 controls the second stopwatch 50 to operate after the counted duration $D_1$, thus the second stopwatch 50 begins to count time elapsing (duration $D_3$) after the end of the counted duration $D_1$. When the controller 20 obtains a next first level signal $S_1$ and the counted elapsing duration $D_3$ between the two successive first level signals $S_1$ is less than a third preset duration $D_{p3}$, the airflow sensor 10 is operating abnormally (a duration between two successive inhalations should not be too short when the user is smoking normally). Such abnormality according to signals received means that high level signal and low level signal are alternating during smoking. Then, the controller 20 controls the atomizer 40 to stop operating when a total duration $D_4$ of the successive first level signals $S_1$ reaches the first preset duration $D_{p1}$. For example, when the total duration $D_4$ of the successive first level signals $S_1$ is greater than 10 seconds (the first preset duration $D_{p1}$), the atomizer 40 stops operating. Thus, when the airflow sensor 10 is operating abnormally, the atomizer 20 can still operate normally to provide smoke with a stable amount. The total duration $D_4$ of the successive first level signals $S_1$ means a sum of the durations of each first level signal $S_1$, together with the elapsing duration $D_3$ between the two successive first level signals $S_1$ being less than the third preset duration $D_{p3}$. The third preset duration $D_{p3}$ can be 1 second. For example, the first level signal $S_1$ can be detected for the second time within 1 second (the third preset duration $D_{p1}$) after the previous duration $D_1$ ends, and can be detected for the third time within 1 second after the end of the previous duration $D_1$. Then, the total duration $D_4$ equals the sum of the durations $D_1$ following the three first level signals $S_1$.

When a next first level signal $S_1$ is not detected before the counted elapsing duration $D_3$ reaches the third preset duration $D_{p1}$, the user is taken to have stopped inhaling, and the airflow sensor 10 is taken to be operating normally. In the normal manner, the controller 10 then controls the atomizer 40 to stop operating.

In an embodiment, after the controller 20 controls the atomizer 40 to stop operating, the controller 20 further obtains the signal S from the airflow sensor 10 again.

In an embodiment, the electronic cigarette 100 further includes a power supply 60 that is electrically connected to the atomizer 40.

Figure 2:
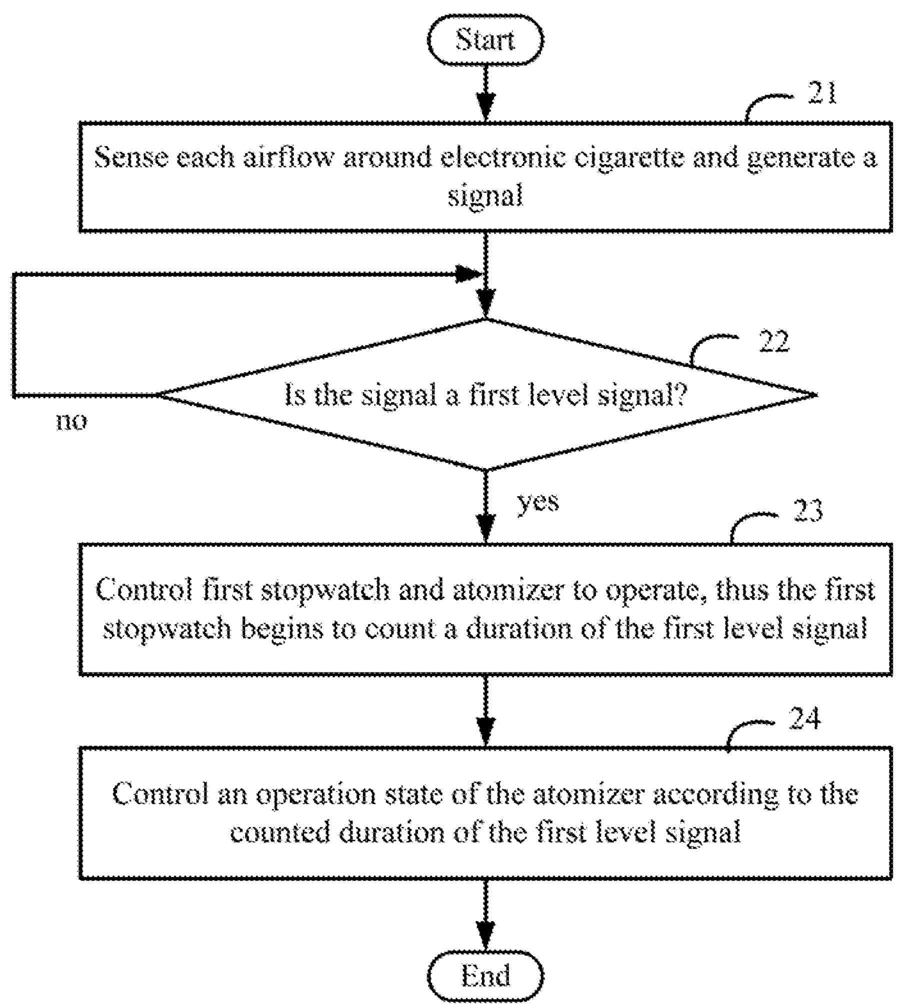
FIG. 2 is a flowchart of an embodiment of a method for controlling an electronic cigarette.

FIG. 2 shows an embodiment of a method for controlling an electronic cigarette. The method is provided by way of example, as there are a variety of ways to carry out the method. The method described below can be carried out using the configurations illustrated in FIG. 1, for example, and various elements of these figures are referenced in explaining example method. Each block shown in FIG. 2 represents one or more processes, methods, or subroutines, carried out in the example method. Furthermore, the illustrated order of blocks is illustrative only and the order of the blocks can be changed. Additional blocks can be added or fewer blocks may be utilized, without departing from this disclosure. The example method can begin at block 21.

At block 21, the airflow sensor 10 senses each airflow around the electronic cigarette 100 and generates a signal S according to each sensed airflow.

At block 22, the controller 20 obtains each signal S from the airflow sensor 10, and determines whether the signal S is a first level signal $S_1$. If yes, the procedure proceeds to block 13. Otherwise, the electronic cigarette 100 does not respond to the signal S, and block 22 is repeated.

At block 23, the controller 20 controls the first stopwatch 30 and the atomizer 40 to operate, thus the first stopwatch 30 begins to count a duration $D_1$ of the first level signal $S_1$.

At block 24, the controller 20 controls an operation state of the atomizer 40 according to the counted duration of the first level signal $S_1$.

Figure 3:
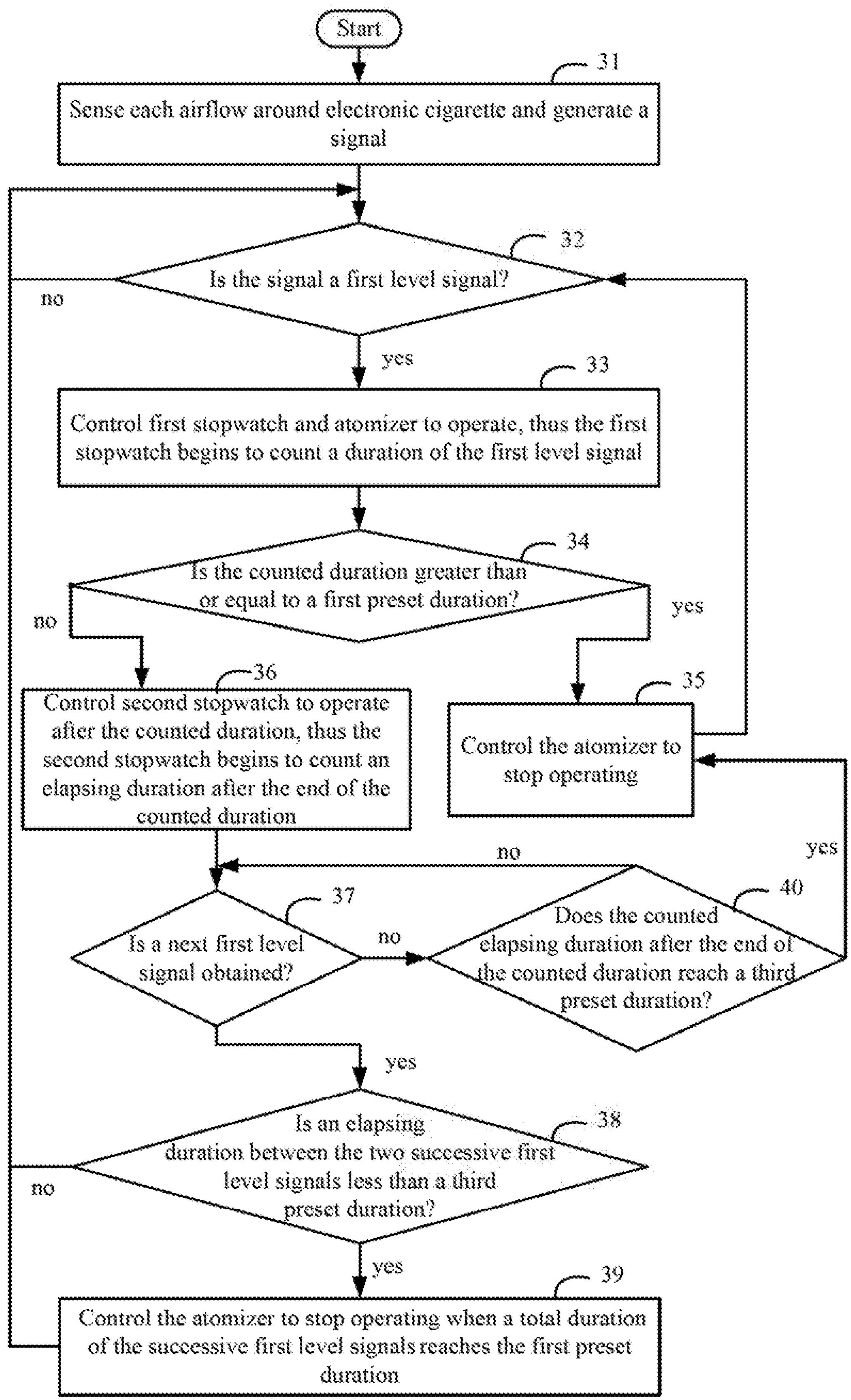
FIG. 3 is a flowchart of another embodiment of a method for controlling an electronic cigarette.

FIG. 3 shows another embodiment of a method for controlling an electronic cigarette 100. The example method can begin at block 31.

At block 31, the airflow sensor 10 senses each airflow around the electronic cigarette 100 and generates a signal S according to each sensed airflow.

At block 32, the controller 20 obtains each signal from the airflow sensor 10, and determines whether the signal S is a first level signal $S_1$. If yes, the procedure proceeds to block 33. Otherwise, block 32 is repeated.

At block 33, the controller 20 controls the first stopwatch 30 and the atomizer 40 to operate, thus the first stopwatch 30 begins to count a duration $D_1$ of the first level signal $S_1$.

At block 34, the controller 20 determines whether the counted $D_1$ of the first level signal $S_1$ is greater than or equals to a first preset duration $D_{p1}$. If yes, the procedure proceeds to block 35. Otherwise, the procedure proceeds to block 36.

At block 35, the controller 20 controls the atomizer 40 to stop operating to avoid erroneous operation. Only when the next signal obtained by controller 20 is a second level signal $S_2$ which is different from the first level signal $S_1$ can the controller 20 control the atomizer 40 to operate again. In an embodiment, after the controller 20 controls the atomizer 40 to stop operating, the controller 20 further obtains the signal S from the airflow sensor 10 again. That is, block 32 is repeated.

At block 36, the controller 20 controls the second stopwatch 50 to operate after the counted duration $D_1$, thus the second stopwatch 50 begins to count an elapsing duration $D_3$ after the end of the counted duration $D_1$.

At block 37, the controller 20 determines whether a next first level signal $S_1$ is obtained. If yes, the procedure proceeds to block 38. Otherwise, the procedure proceeds to block 40.

At block 38, the controller 20 determines whether an elapsing duration $D_3$ between the two successive first level signals $S_1$ is less than a third preset duration $D_{p3}$. If yes, the procedure proceeds to block 39. Otherwise, block 32 is repeated.

At block 39, the controller 20 controls the atomizer 40 to stop operating when a total duration $D_4$ of the successive first level signals $S_1$ reaches the first preset duration $D_{p1}$. Then, block 32 is repeated.

At block 40, the controller 20 determines whether the counted elapsing duration $D_3$ after the end of the counted duration $D_1$ reaches the third preset duration $D_{p1}$. If yes, block 35 is repeated. Otherwise, block 37 is repeated.

With the above configuration, the atomizer 40 is controlled according to the duration $D_1$ of the first level signal $S_1$. Thus, the quality of electronic cigarette 100 and the health of the user who smokes the electronic cigarette 100 can be ensured. Furthermore, instabilities of the amount of smoke, which are caused by signal instabilities of the airflow sensor 10, can be avoided.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A method for controlling an electronic cigarette, the electronic cigarette comprising an airflow sensor, a first stopwatch, a second stopwatch, and an atomizer, the method comprising:

sensing each airflow around the electronic cigarette and generating a signal according to each sensed airflow;

obtaining each signal and determining whether the signal is a first level signal;

controlling the first stopwatch and the atomizer to operate when the signal is the first level signal, thus the first stopwatch begins to count a duration of the first level signal;

when the counted duration is less than a first preset duration, controlling the atomizer to continue operating and the second stopwatch to operate once the first level signal stops, thus the second stopwatch begins to count an elapsing duration after the end of the counted duration; and when the controller obtains a next first level signal and the counted elapsing duration between two successive first level signals is less than a third preset duration, controlling the atomizer to stop operating when a total duration of the successive first level signals reaches the first preset duration, the third preset duration being less than the first preset duration.

2. The method of claim 1, further comprising:

when a next first level signal is not detected before the counted elapsing duration reaches the third preset duration, controlling the atomizer to stop operating.

3. The method of claim 1, wherein the third preset duration is 1 second to 3 seconds.

4. The method of claim 1, wherein the first level signal is generated when the sensed airflow around the electronic cigarette satisfies a smoking condition.

5. An electronic cigarette comprising:

an airflow sensor configured to sense each airflow around the electronic cigarette and generate a signal according to each sensed airflow;

a first stopwatch;

a second stopwatch;

an atomizer; and a controller configured to:

obtain each signal and determine whether the signal is a first level signal;

control the first stopwatch and the atomizer to operate when the signal is the first level signal, thus the first stopwatch begins to count a duration of the first level signal;

when the counted duration is less than a first preset duration, control the atomizer to continue operating and the second stopwatch to operate once the first level signal stops, thus the second stopwatch begins to count an elapsing duration after the end of the counted duration;

when the controller obtains a next first level signal and the counted elapsing duration between two successive first level signals is less than a third preset duration, control the atomizer to stop operating when a total duration of the successive first level signals reaches the first preset duration, the third preset duration being less than the first preset duration.

6. The electronic cigarette of claim 5, wherein when a next first level signal is not detected before the counted elapsing duration reaches the third preset duration, the controller is further configured to control the atomizer to stop operating.

7. The electronic cigarette of claim 5, wherein the third preset duration is 1 second to 3 seconds.

8. The electronic cigarette of claim 5, wherein the first level signal is generated when the sensed airflow around the electronic cigarette satisfies a smoking condition.

9. The electronic cigarette of claim 5, further comprising a power supply electrically connected to the atomizer.

* * * * *